United States Patent
Somani

(10) Patent No.: US 11,941,674 B2
(45) Date of Patent: Mar. 26, 2024

(54) SYSTEM AND METHOD FOR MANAGING A LOCAL AREA SHOPPING NETWORK

(71) Applicant: EFFISIM CORP, Middletown, DE (US)

(72) Inventor: Nirmal Somani, Orlando, FL (US)

(*) Notice: Subject to any disclaimer, the term of this patent is extended or adjusted under 35 U.S.C. 154(b) by 199 days.

(21) Appl. No.: 17/574,594

(22) Filed: Jan. 13, 2022

(65) Prior Publication Data

US 2023/0222555 A1   Jul. 13, 2023

(51) Int. Cl.
*G06Q 30/0601* (2023.01)
*G06Q 10/083* (2023.01)
(Continued)

(52) U.S. Cl.
CPC ..... *G06Q 30/0605* (2013.01); *G06Q 10/0838* (2013.01); *G06Q 10/1097* (2013.01); *G06Q 20/12* (2013.01); *G06Q 30/0635* (2013.01)

(58) Field of Classification Search
CPC ............................ G06Q 10/00–50/00
(Continued)

(56) References Cited

U.S. PATENT DOCUMENTS

| 5,310,997 | A | * | 5/1994 | Roach | G06Q 10/087 235/375 |
| 8,630,990 | B2 | * | 1/2014 | Gowel | G09B 7/00 707/706 |

(Continued)

FOREIGN PATENT DOCUMENTS

| IN | 201911050650 | 6/2021 |
| WO | 2017086515 A1 | 5/2017 |

OTHER PUBLICATIONS

This brand is bridging the digital divide for small vendors to enter e-retail; https://www.hindustantimes.com/brand-post/this-brand-is-bridging-the-digital-divide-for-small-vendors-to-enter-eretail-101636383082949.html; ByHT Brand Studio.

*Primary Examiner* — Alan S Miller
(74) *Attorney, Agent, or Firm* — The Rapacke Law Group, P.A.; Andrew S. Rapacke

(57) ABSTRACT

A system for managing a local area shopping network is disclosed. The plurality of subsystems includes an order request subsystem, configured to receive a request of a product order from registered/unregistered (a customer can be guest customer) customers. The plurality of subsystems includes a parameter determination subsystem configured to determine a delivery area, a delivery schedule for sellers and determine product pickup area for the customers/buyers based on their preference and location. A buyer may decide for delivery only, in that case there is no pickup area/perimeter. The plurality of subsystems includes a product transaction subsystem. The product transaction subsystem is configured to identify (all sellers. If there are none that meet criteria then it is blank) one seller from the list of the registered sellers based on received request of the product order and establish a direct communication link with the customer. The product transaction subsystem is configured to complete the delivery of the order to the registered customers upon accepting the received request. (sellers do delivery and not the application) Customers and sellers are connected in a single platform, and transaction is facilitated.

14 Claims, 8 Drawing Sheets

(51) Int. Cl.
*G06Q 10/1093* (2023.01)
*G06Q 20/12* (2012.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 10,078,861 | B1* | 9/2018 | Clare | G06Q 30/0635 |
| 11,087,383 | B1* | 8/2021 | Clare | G06Q 30/0635 |
| 11,393,014 | B2* | 7/2022 | Patel | G06Q 30/0635 |
| 2002/0049638 | A1* | 4/2002 | Ito | G06Q 30/0635 |
| | | | | 705/26.81 |
| 2007/0150375 | A1* | 6/2007 | Yang | G06Q 10/08 |
| | | | | 705/26.81 |
| 2007/0185778 | A1* | 8/2007 | Weng | G06Q 30/0635 |
| | | | | 705/26.41 |
| 2007/0265935 | A1* | 11/2007 | Woycik | G07F 5/18 |
| | | | | 705/26.5 |
| 2012/0185356 | A1* | 7/2012 | Barron | G06Q 10/08 |
| | | | | 705/26.61 |
| 2013/0211968 | A1* | 8/2013 | Patro | G06Q 30/06 |
| | | | | 705/27.1 |
| 2014/0297470 | A1* | 10/2014 | Ramadge | G06Q 30/0635 |
| | | | | 705/26.41 |
| 2015/0106229 | A1* | 4/2015 | Lyman | G06Q 30/0639 |
| | | | | 705/26.9 |
| 2015/0178778 | A1* | 6/2015 | Lee | G06Q 30/0261 |
| | | | | 705/14.58 |
| 2015/0294262 | A1* | 10/2015 | Nelson | G06Q 10/083 |
| | | | | 705/330 |
| 2016/0224934 | A1* | 8/2016 | Ramalingam | G06Q 10/0833 |
| 2016/0247113 | A1* | 8/2016 | Rademaker | G06Q 10/083 |
| 2018/0047242 | A1* | 2/2018 | Lutnick | G06Q 50/12 |
| 2018/0253682 | A1* | 9/2018 | Gilman | G06Q 10/087 |
| 2020/0357040 | A1* | 11/2020 | Patel | G06Q 30/0639 |
| 2022/0164768 | A1* | 5/2022 | May | G06Q 10/087 |

* cited by examiner

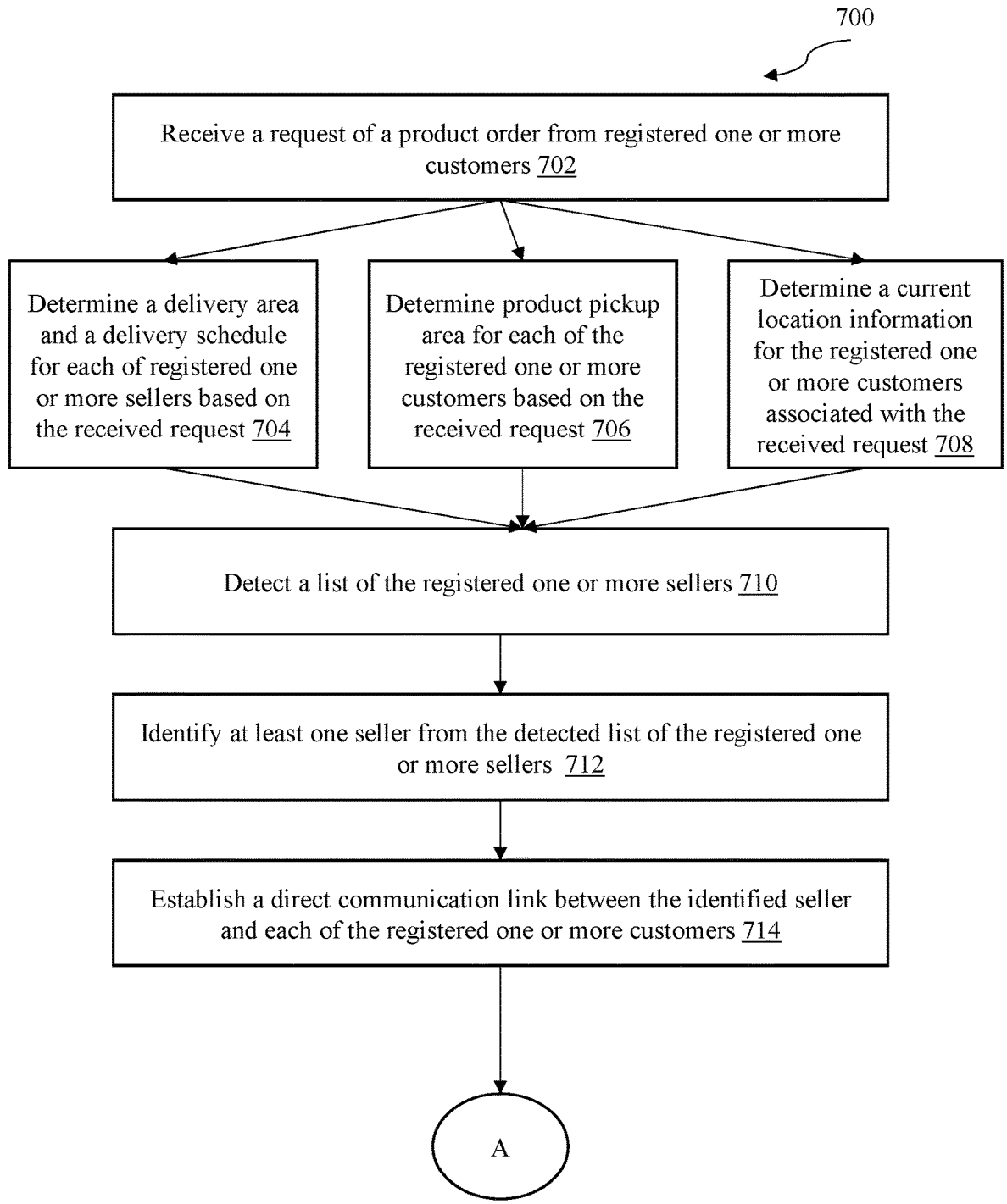
FIG. 7 (CONTD)

SYSTEM AND METHOD FOR MANAGING A LOCAL AREA SHOPPING NETWORK

FIELD OF INVENTION

Embodiments of the present disclosure relates to an online marketplace, and more particularly to a system and a method for managing a local area shopping network.

BACKGROUND

Online marketplaces include multiple sellers listing products for sale and multiple buyers buying those listed products. After receipt of payment from a buyer, sellers ship/deliver the products to the buyer. Usually, the online marketplaces are designed to link a seller and the buyer.

Conventionally, such online marketplaces act as a third-party platform, where the buyer may interact with the seller and order products. The buyer may have no way to ascertain ordered products quality or get in touch with a particular seller who the buyer trusts. Such online marketplaces often lead to fraudulent practices.

Furthermore, conventionally, delivery of such products in any online marketplaces are done by any third-party logistics company. Such logistics facilitator usually charges a fee for delivery. In many situations, such fees are higher than the actual order placed. Furthermore, due to the intermediate interaction of buyers and sellers with such logistics company, the actual value charged and received by the seller are completely unknown to the buyers of the product. In cases where there is no registered seller for a product desired by the buyer, there are no mechanisms in the existing online marketplaces to dynamically fetch local and small vendors of such product and deliver that product.

Hence, there is a need for an improved system method for managing a local area shopping network and a method to operate the same and therefore address the aforementioned issues.

BRIEF DESCRIPTION

In accordance with one embodiment of the disclosure, a system for managing a local area shopping network is disclosed. The system includes a hardware processor. The system also includes a memory coupled to the hardware processor. The memory comprises a set of program instructions in the form of a plurality of subsystems and configured to be executed by the hardware processor.

The plurality of subsystems includes an order request subsystem. The order request subsystem is configured to receive a request of a product order from registered one or more customers. The plurality of subsystems also includes a parameter determination subsystem. The parameter determination subsystem is configured to determine a delivery area and a delivery schedule for each of registered one or more sellers based on the received request. The parameter determination subsystem is also configured to determine product pickup area for each of the registered one or more customers based on the received request. The parameter determination subsystem is also configured to determine a current location information of the registered one or more customers associated with the received request based on real-time location tracking model.

The plurality of subsystems also includes a product transaction subsystem. The product transaction subsystem is configured to detect a list of the registered one or more sellers based on the determined delivery area for each of registered one or more sellers and the determined current location information for each of the registered one or more customers. The product transaction subsystem is also configured to identify at least one seller from the detected list of the registered one or more sellers based on the received request of the product order. (If no sellers meet the criteria then the system will show a message notifying the buyer. It is not needed that at least a seller be shown) The product transaction subsystem is also configured to establish a direct communication link between the identified seller and each of the registered one or more customers. The product transaction subsystem is also configured to forward the received request of the product order to the identified seller for delivery. The product transaction subsystem is also configured to receive acceptance message for the forwarded request of the product order from the identified seller. The product transaction subsystem is also configured to complete the delivery of the product order to the registered one or more customers associated with the received request upon accepting the received request. (The application won't do delivery, it will be done by the sellers.)

The plurality of subsystems also includes a transaction management subsystem. The transaction management subsystem is configured to transfer the payment of the delivered product order directly to the identified seller from the registered one or more customers through one or more payment preferences.

In accordance with one embodiment of the disclosure, a method for managing a local area shopping network is disclosed. The method includes receiving a request of a product order from registered one or more customers. The method also includes determining a delivery area and a delivery schedule for each of registered one or more sellers based on the received request. The method also includes determining product pickup area for each of the registered one or more customers based on the received request, wherein the product pickup area is the customer pickup perimeter. The method also includes determining a current location information for the registered one or more customers associated with the received request based on real-time (or user provided location) location tracking model.

The method also includes detecting a list of the registered one or more sellers based on the determined delivery area for each of registered one or more sellers and the determined current location information of the registered one or more customers. The method also includes identifying at least one seller from the detected list of the registered one or more sellers based on received request of the product order. The method also includes establishing a direct communication link between the identified seller and each of the registered one or more customers. The method also includes forwarding the received request of the product order to the identified seller for delivery.

The method also includes receiving acceptance message for the forwarded request of the product order by the identified seller. The method also includes completing the delivery of the product order to the registered one or more customers associated with the received request upon accepting the received request. (delivery/shipment is seller responsibility and not done by the application. The application will track delivery) The method also includes transferring payment of the delivered product order directly to the identified seller from the registered one or more customers through the one or more payment preferences.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
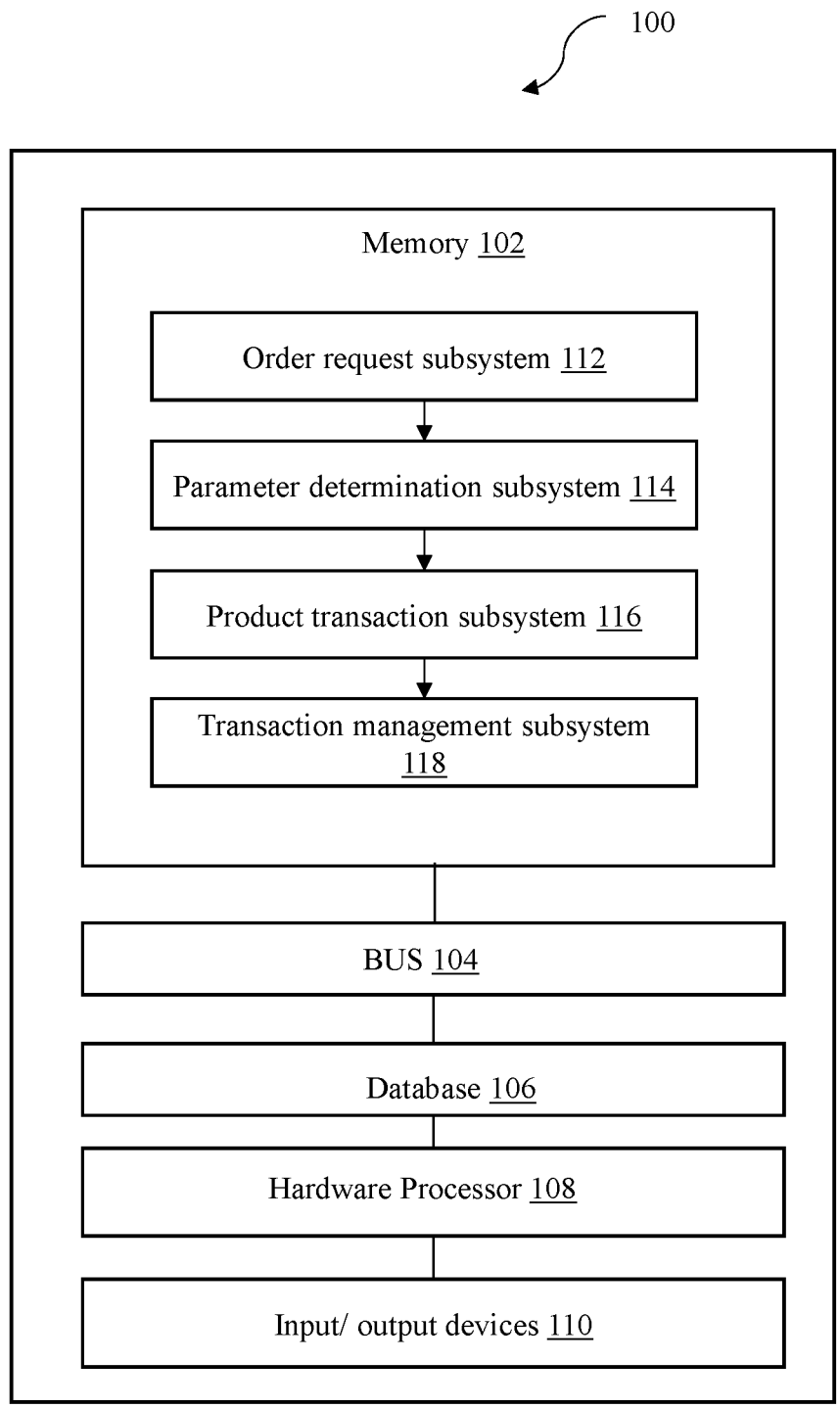
FIG. 1 is a block diagram illustrating an exemplary computing system for managing a local area shopping network in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram illustrating an exemplary computing system 100 for managing a local area shopping network in accordance with an embodiment of the present disclosure. The computing system 100 provides one or more sellers a way to define custom delivery area and custom schedule time. In such embodiment, the one or more sellers sell products in a specified local area and thereby provide services such as pickup and delivery to each of the one or more customers.

The computing system 100 establishes direct shopping link between the one or more customers and the one or more sellers. A local area shopping network is established as an interactive linkage is created between the one or more customers and local one or more sellers. In an embodiment, the one or more customers are 'buyers' of the products.

The computing system 100 includes a hardware processor 108. The computing system 100 also includes a memory 102 coupled to the hardware processor 108. The memory 102 comprises a set of program instructions in the form of a plurality of subsystems and configured to be executed by the hardware processor 108. Input/output (I/O) devices 110 (including but not limited to keyboards, displays, pointing devices, etc.) can be coupled to the computing system 100 either directly or through intervening I/O controllers.

The hardware processor 108, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 102 includes a plurality of subsystems stored in the form of executable program which instructs the hardware processor 108 via bus 104 to perform the method steps. The plurality of subsystems has following subsystems: an order request subsystem 112, a parameter determination subsystem 114, a product transaction subsystem 116 and a transaction management subsystem 118.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the hardware processor 108.

The plurality of subsystem includes a registration subsystem. The registration subsystem is configured to register each of one or more sellers with seller information. As used herein, the term "seller" refers to the person who is selling any product through the computing system 100.

In one embodiment, the seller information includes seller address information, delivery area information, selling mode information and product information. In one such embodiment, the selling mode information includes at least one of delivery mode and pick up mode. In another such embodiment, seller address information includes address of a shop or the seller, the shop registration number and the like.

In one specific embodiment, the product information may include on-sale product details, product cost, product tax details and the like. In another specific embodiment, the delivery area information may include distance range of delivery service from a specific location as well as geofence coordinate boundary information. As used herein, the term "geofence" is a virtual geographic boundary, defined by Global Positioning System (GPS) or Radio Frequency Identification (RFID) technology. With all such stated seller information, a seller dashboard is generated for each of the registered one or more sellers.

The registration subsystem is also configured to register each of one or more customers with customer information. As used herein, the term "customer" refers to a person who buys good or services from the one or more sellers. In one embodiment, the customer information includes customer address information, customer location information and one or more purchasing parameters. In one such embodiment, the one or more purchasing parameters includes price range information and product category information. In another such embodiment, customer address information includes address of a customer, customer specified pickup area and the like. With all such stated customer information, a customer dashboard is generated where one or more customers may shop.

The plurality of subsystems includes an order request subsystem 112. The order request subsystem 112 is configured to receive a request of a product order from registered one or more customers. The request includes customer information, product information and a preferred mode of order receival. In such embodiment, each of the registered one or more customers for shopping provides a request of the product order in the computing system 100. Each of the registered one or more customers inputs details of the product order.

The plurality of subsystems also includes a parameter determination subsystem 114. The parameter determination subsystem 114 is configured to determine a delivery area and a delivery schedule for each of the registered one or more sellers based on the received request. In such embodiment, the delivery area is the delivery perimeter for each of the registered one or more sellers. In one exemplary embodiment, each of the registered one or more sellers may deliver any ordered product within the delivery perimeter as added service.

In one specific embodiment, for determining the delivery area, the parameter determination subsystem 114 is configured to extract product information from the received request. Further, the parameter determination subsystem 114 is configured to apply the delivery area information of each of the registered one or more sellers to an artificial intelligence-based parameter determination model. The parameter determination subsystem 114 determines geofence delivery area. In such embodiment, the parameter determination subsystem 114 determines the delivery area listed by the registered one or more sellers matching the extracted product related information based on output of the trained artificial intelligence-based parameter determination model. The artificial intelligence-based parameter determination model predicts the delivery area geofence boundary.

In another specific embodiment, for determining the delivery schedule, the parameter determination subsystem 114 is configured to extract the delivery area information and the selling mode information from the received request. Further, the parameter determination subsystem 114 is configured to apply the delivery area information and the selling mode information of each of the registered one or more sellers to an artificial intelligence-based scheduling model. In such embodiment, the parameter determination subsystem 114 determines the delivery schedule based on output of the trained artificial intelligence-based scheduling model. The delivery schedule comprises delivery once in a day, delivery once in a week and delivery twice in a week and the like.

The parameter determination subsystem 114 is also configured to determine product pickup area for each of the registered one or more customers. In such embodiment, the product pickup area is the customer pickup perimeter. In one exemplary embodiment, each of the registered one or more customers may pick up any ordered product within the pickup perimeter.

In one specific embodiment, for determining the product pickup area, the parameter determination subsystem 114 is configured to extract the purchasing mode information from the received customer information. Further, parameter determination subsystem 114 is configured to apply the purchasing mode information of each of the registered one or more customers to an artificial intelligence-based parameter determination model. The parameter determination subsystem 114 determines geofence product pickup area based on output of the trained artificial intelligence-based parameter determination model. The parameter determination subsystem 114 is also configured to determine a current location information of the registered one or more customers associated with the received request based on real-time location tracking model. The real-time location tracking model includes information from the Global Positioning System (GPS).

The plurality of subsystems also includes a product transaction subsystem 116. The product transaction subsystem 116 is configured to detect a list of the registered one or more sellers based on the determined delivery area for each of registered one or more sellers and the determined current location information of the registered one or more customers. The computing system 100 isolates a list of registered one or more sellers fulfilling the criteria of the determined delivery area and the determined current location information.

The product transaction subsystem 116 is also configured to identify at least one seller from the detected list of the registered one or more sellers based on the received request of the product order. In one specific embodiment, to identify the seller from the list of the registered one or more sellers based on received request of the product order, the product transaction subsystem 116 is configured to extract product information from the received request. The product related information comprises product category, product quantity, product specifications.

Further, the product transaction subsystem 116 is configured to determine first set of sellers accepting orders for the extracted product information from a prestored list of sellers. The product transaction subsystem 116 is configured to extract one or more search strings related to preferred mode of order receival from the received request of product order.

The product transaction subsystem 116 determines final set of sellers from among the determined first set of sellers matching the extracted preferred mode of order receival by mapping the extracted one or more search strings related to preferred mode of order receival with corresponding prestored search strings for mode of order receival. Further, the product transaction subsystem 116 identifies best seller from among the determined final set of sellers based on user rating, delivery speed, and proximity to current location of the registered one or more customers.

For example, a customer request product order of "aromatic bar soap" of specific price range through the order request subsystem 112. The product transaction subsystem 116 maps preferred mode of order receival of the product order with the final set of sellers. In such specific exemplary embodiment, the product transaction subsystem 116 matches preferred mode of order receival and identifies best seller from among the determined final set of sellers based on user rating, delivery speed, and proximity to current location of the customer. According to ordered product quantity and product specifications, the product may be delivered.

The product transaction subsystem 116 is also configured to a direct communication link between the identified seller and each of the registered one or more customers. The computing system 100 provides the identified seller and each of the registered one or more customers a platform for shopping through virtual interaction. Furthermore, as each of the one or more sellers is identified based on the determined close by location, the computing system 100 facilitates local area shopping network.

The product transaction subsystem 116 is also configured to forward the received request of the product order to the identified seller for delivery. In such embodiment, the identified seller accepts the received request of the product order and the customer receive acceptance message.

The product transaction subsystem 116 is also configured complete the delivery of the product order to the registered one or more customers associated with the received request upon accepting the received request. In such embodiment, for delivery of the product order to each of the registered one or more customers, the product transaction subsystem 116 is configured to enable delivery through seller delivery within the determined delivery area and delivery through customer pick up within the determined product pickup area.

For example, for delivering any selected product order, the customer may get the product order delivered either through shop delivery within the determined delivery area or through individual customer pickup within the determined product pickup area.

Further, in identifying the seller from the list of the registered one or more sellers based on received request of the product order, the product transaction subsystem 116 is configured to determine local sellers in proximity to the current location of the registered one or more customers.

The plurality of subsystems also includes a transaction management subsystem 118. The transaction management subsystem 118 is configured to transfer payment of the delivered product order to identified seller directly from the each of the registered one or more customers through the one or more payment preferences. In one embodiment, each of the registered one or more customers directly and securely pays the product order cost to the identified seller. The one or more payment preferences may include any third-party bank payment facility. This method thus avoids the involvement of any third party in between the buyer and the seller.

In such embodiment, the transaction management subsystem 118 is configured to manage dispute settlement, cancellation facility, and refund payment in association with the delivered product order. For dispute settlement and refund payment, the computing system 100 provides pre-stored rules as set by each of the registered one or more sellers. A database 106 associated with the computing system 100 stores all such pre-stored rules.

Furthermore, in transferring the payment of the delivered product order directly to the identified seller from the registered one or more customers through one or more payment preferences, the transaction management subsystem 118 is configured to: receive, at a real time, a preferred payment mode and bank account information from the identified seller. Further, the transaction management subsystem 118 is configured to establish a secure payment link between the received bank account information of the identified seller and a payment type of the registered one or more customers via a payment gateway. The registered one or more customers choose one among a plurality of payment types to complete the payment. Also, the transaction management subsystem 118 is configured to: transfer payment amount from the payment type of the registered one or more customers directly to the received bank account information of the identified seller via the established secure payment link.

Figure 2:
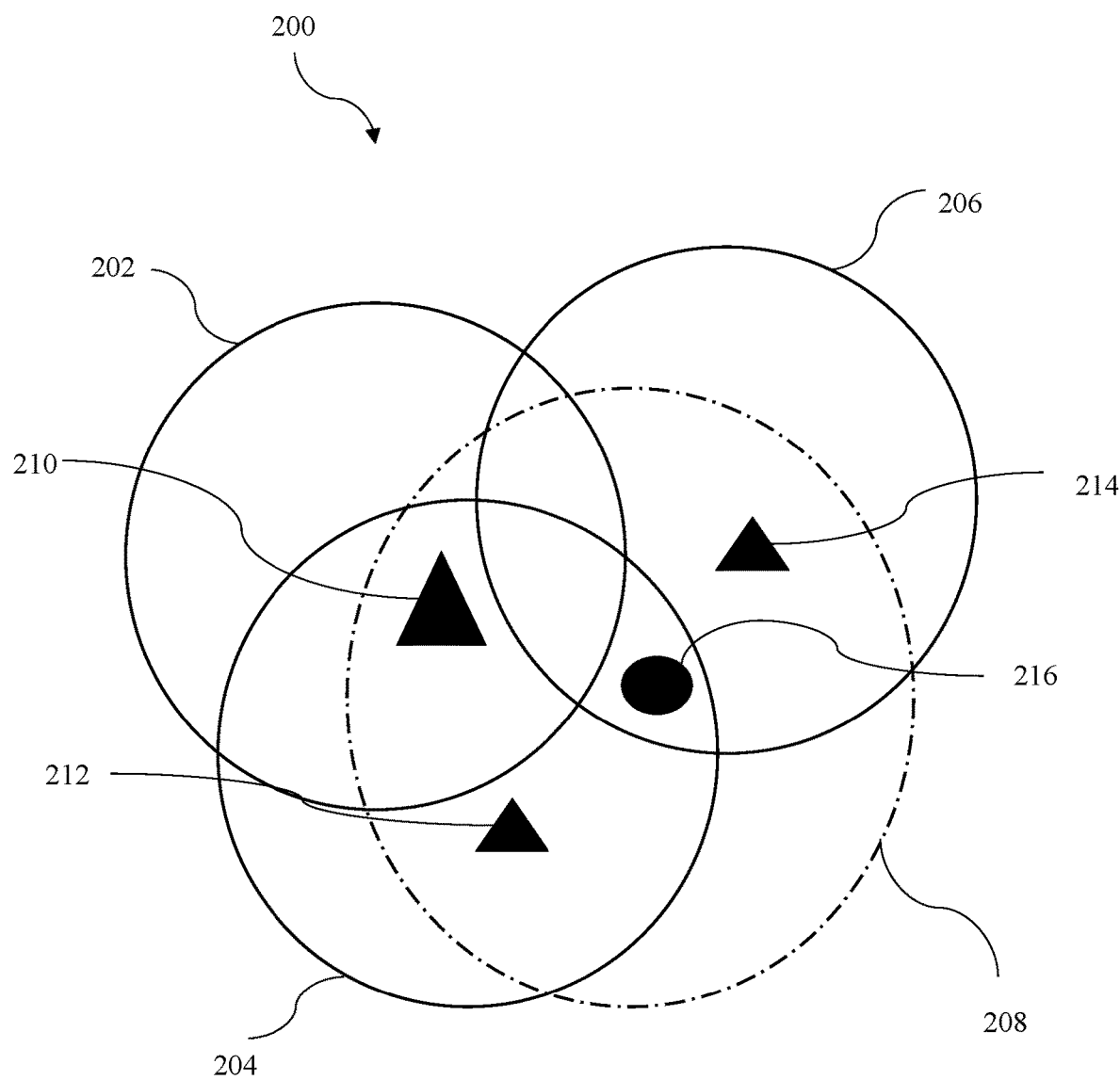
FIG. 2 is a schematic representation illustrating a delivery area of one or more sellers and a pickup area of a customer in accordance with an embodiment of the present disclosure.

FIG. 2 is a schematic representation illustrating a delivery area of one or more sellers and a pickup area of a customer in accordance with an embodiment of the present disclosure. FIG. 2 illustrates determined delivery circular area of seller A 202, seller B 204 and seller C 206. Furthermore, FIG. 2 also provides the circular pickup area of customer X 208.

In such exemplary embodiment, the customer X 208 may pick up any product order from seller A 202 at point zone P 210. The customer X 208 may pick up any product order from seller B 204 at point zone Q 212. The customer X 208 may pick up any product order from seller C 206 at point zone P 214. For pick up option, the computing system 100 use the search radius and map every seller that is in that radius.

Moreover, the seller B 204 and the seller C 206 may deliver the product order to delivery address Z 216 of the customer X 208. FIG. 2 shows that seller A 202 does not deliver at delivery address Z 216 of the customer X 208.

Figure 3:
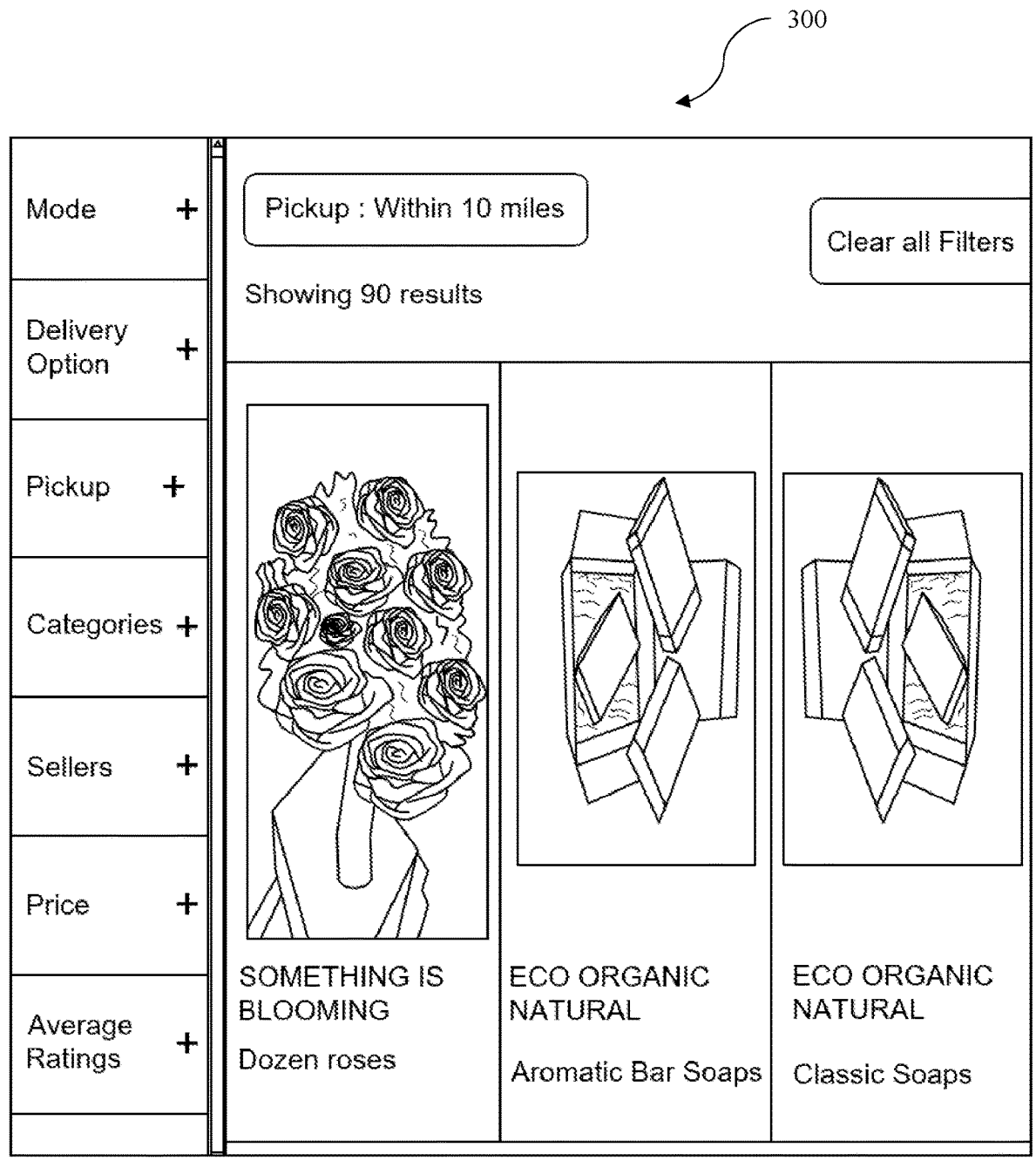
FIG. 3 is a snapshot illustrating an exemplary customer dashboard in accordance with an embodiment of the present disclosure.

FIG. 3 is a snapshot illustrating an exemplary customer dashboard 300 in accordance with an embodiment of the present disclosure. The customer dashboard 300 is fabricated with different input classifications to capture order request from each of the registered one or more customers. Some of the input classifications are mode, deliver option, pickup, categories, sellers and price. During the process of request generation of any product order, each of the registered customer provides inputs via the classified options. Mode may be "delivery and pickup", "only delivery" or "only pickup". Delivery option may include option to "deliver today", "deliver within a week" and the like.

Pickup may be range of distance within which the customer may pick up. Categories referred here include different product names. Seller classification may include details of different sellers available in the computing system 100. Price classification may include different price range for the product order.

Figure 4:
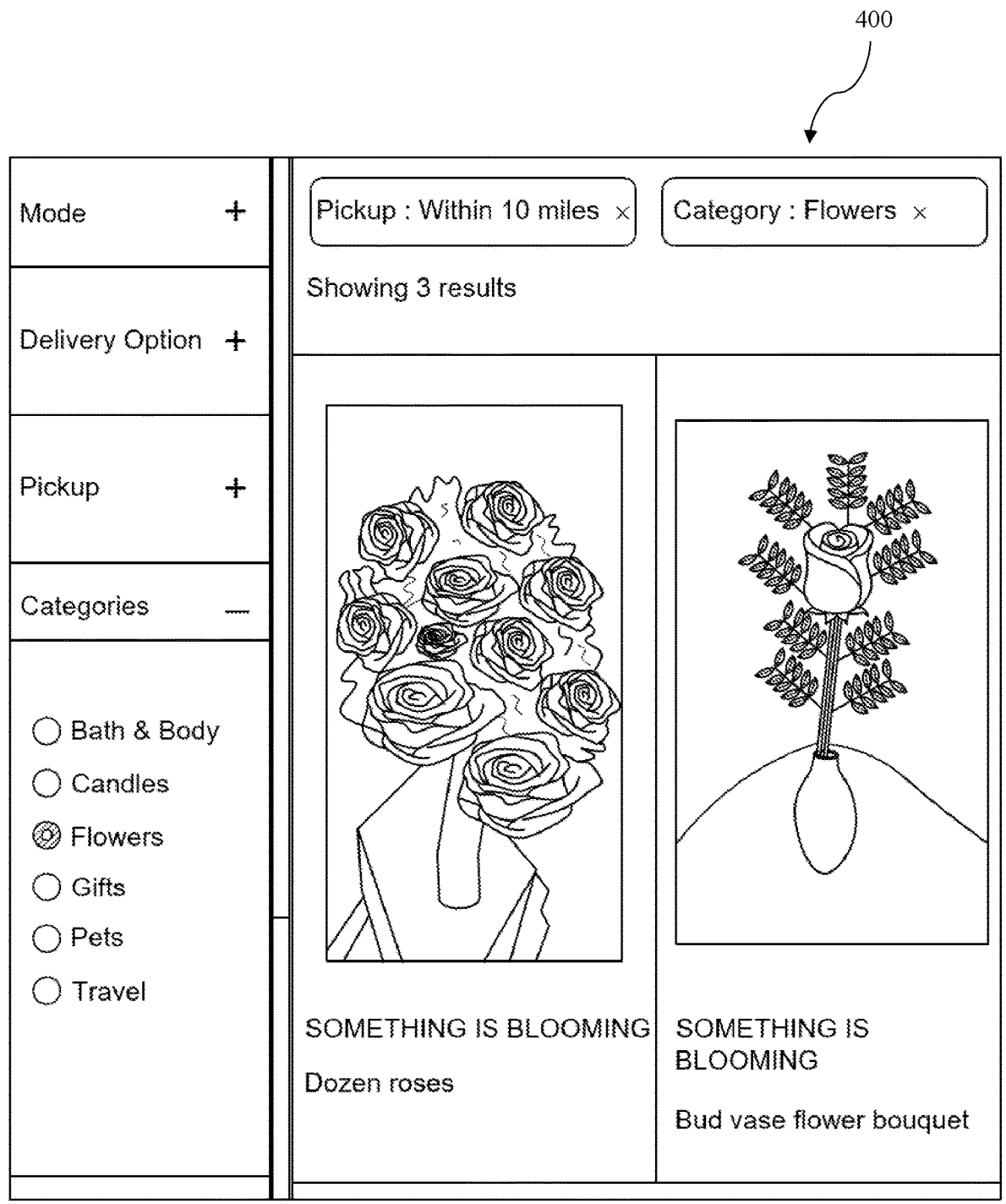
FIG. 4 is a snapshot illustrating the exemplary customer dashboard with applied filters in accordance with an embodiment of the present disclosure.

FIG. 4 is a snapshot illustrating the exemplary customer dashboard 400 with applied filters in accordance with an embodiment of the present disclosure. In such embodiment, the filters are applied through the different input classification. Here, specific filters used are "pickup distance range" and "product: flower".

Figure 5:
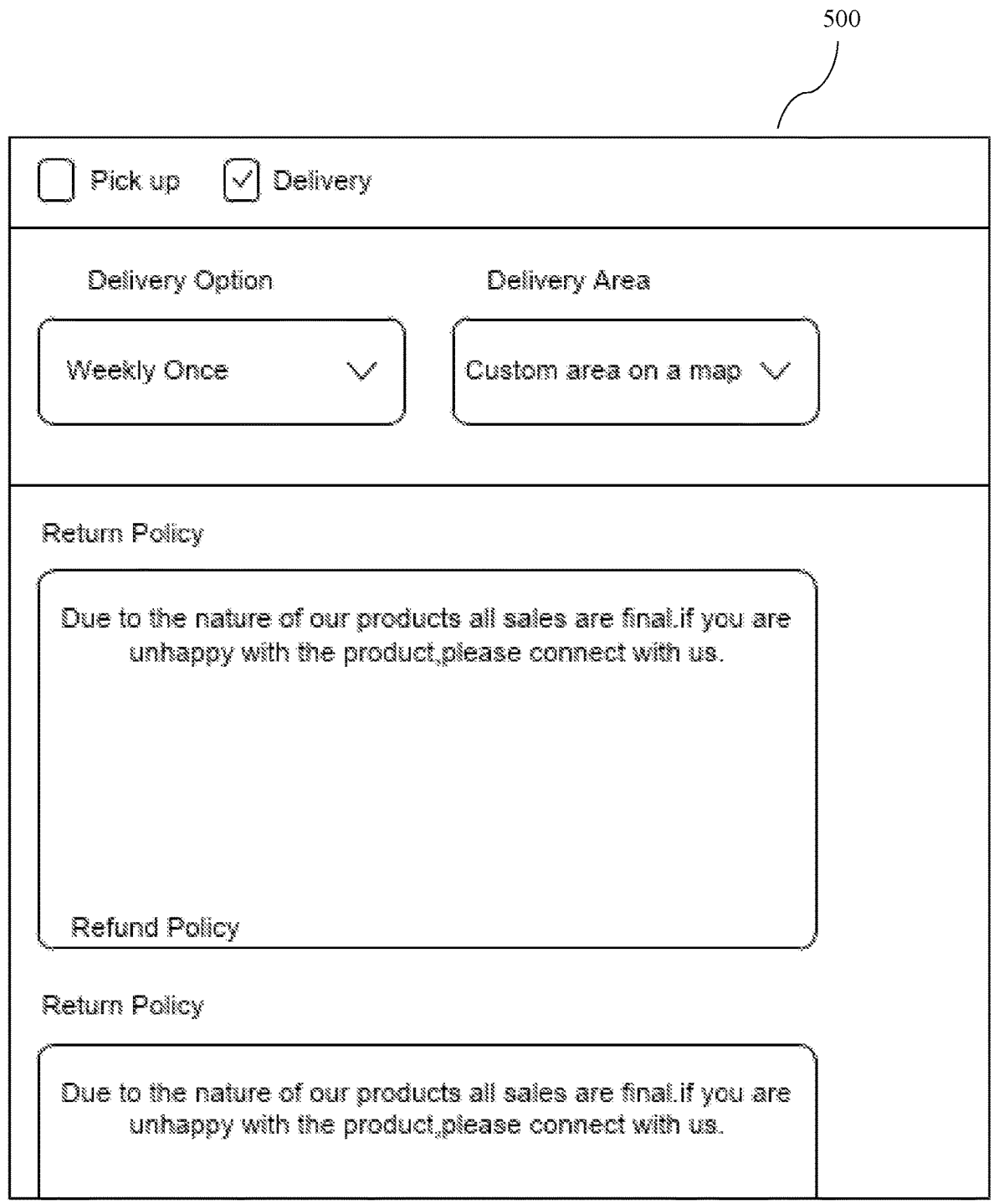
FIG. 5 is a snapshot illustrating the computing system customizing process for delivery or pickup in an exemplary seller dashboard in accordance with an embodiment of the present disclosure.

FIG. 5 is a snapshot illustrating the computing system customizing process for delivery or pickup in an exemplary seller dashboard 500 in accordance with an embodiment of the present disclosure. For any order, each of the registered one or more sellers may fix delivery either through seller delivery or through customer pickup. Delivery may be once in a day, delivery once in a week or delivery twice in a week. In such embodiment, the delivery area is fixed through geofence input by one or more customer.

Figure 6:
FIG. 6 is a snapshot illustrating the exemplary seller dashboard in accordance with an embodiment of the present disclosure.

FIG. 6 is a snapshot illustrating the exemplary seller dashboard 600 in accordance with an embodiment of the present disclosure. The seller dashboard will include list of all products as order by the registered one or more customers. The seller dashboard shows the price of individual product order, tax details on the product ordered and the quantity of the order.

Figure 7:
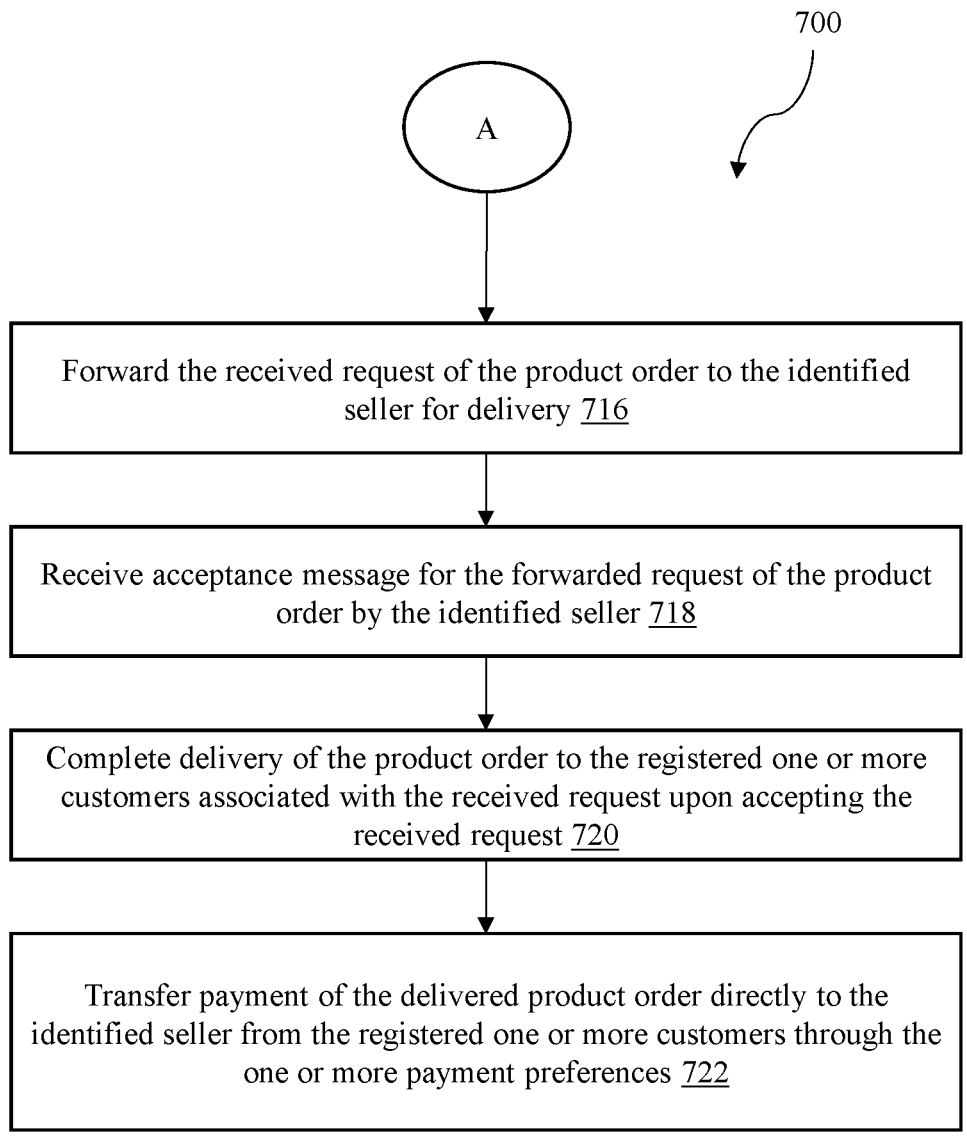
FIG. 7 is a process flowchart illustrating an exemplary method for managing a local area shopping network in accordance with an embodiment of the present disclosure.

FIG. 7 is a process flowchart illustrating an exemplary method 700 for managing a local area shopping network in accordance with an embodiment of the present disclosure.

In step 702, a request of a product order is received from registered one or more customers. In one aspect of the present embodiment, the request of the product order is received by an order request subsystem 112. The request includes customer information, product information and a preferred mode of order receival.

In step 704, a delivery area and a delivery schedule for each of registered one or more sellers is determined based on the received request. In one aspect of the present embodiment, the delivery area and the delivery schedule for each of registered one or more sellers is determined by a parameter determination subsystem 114.

In one such embodiment, for determining the delivery area, the method 700 includes extracting product information from the received request. The method 700 also includes applying the delivery area information of each of the registered one or more sellers to an artificial intelligence-based parameter determination model. The method 700 also includes determining the delivery area listed by the registered one or more sellers matching the extracted product related information based on output of the trained artificial intelligence-based parameter determination.

In another such embodiment, for determining the delivery schedule, the method 700 includes extracting the delivery area information and the selling mode information from the received request. The method 700 also includes applying the delivery area information and the selling mode information of each of the registered one or more sellers to an artificial intelligence-based scheduling model. The method 700 also includes determining the delivery schedule based on output of the trained artificial intelligence-based scheduling model. The delivery schedule comprises delivery once in a day, delivery once in a week or delivery twice in a week.

In step 706, product pickup area for each of the registered one or more customers is determined based on the received request. In one aspect of the present embodiment, the product pickup area for each of the registered one or more customers is determined by the parameter determination subsystem 114. In such embodiment, the product pickup area is the customer pickup perimeter. In one embodiment, for determining the product pickup area, the method 700 includes extracting the purchasing mode information from the received customer information. The method 700 also includes applying the purchasing mode information of each of the registered one or more customers to an artificial intelligence-based parameter determination model. The method 700 also includes determining geofence product pickup area based on output of the trained artificial intelligence-based parameter determination model.

In step 708, a current location information for the registered one or more customers associated with the received request is determined based on real-time location tracking model. In one aspect of the present embodiment, the current location information for the registered one or more customers associated with the received request is determined by the parameter determination subsystem 114.

In step 710, a list of the registered one or more sellers is detected based on the determined delivery area for each of registered one or more sellers and the determined current location information of the registered one or more customers. In one aspect of the present embodiment, the list of the registered one or more sellers is detected by a product transaction subsystem 116.

In step 712, at least one seller from the detected list of the registered one or more sellers is identified based on received request of the product order. In one aspect of the present embodiment, at least one seller from the detected list of the registered one or more sellers is identified by the product transaction subsystem 116. In one embodiment, in identifying the seller from the list of the registered one or more sellers based on received request of the product order, the method 700 includes extracting product information from the received request, wherein the product related information comprises product category, product quantity, product specifications. The method 700 also includes determining first set of sellers accepting orders for the extracted product information from a prestored list of sellers. Further, the method 700 includes extracting one or more search strings related to preferred mode of order receival from the received request of product order.

The method 700 also includes determining final set of sellers from among the determined first set of sellers matching the extracted preferred mode of order receival by mapping the extracted one or more search strings related to preferred mode of order receival with corresponding prestored search strings for mode of order receival.

Moreover, the method 700 also includes identifying best seller from among the determined final set of sellers based on user rating, delivery speed, and proximity to current location of the registered one or more customers.

In step 714, a direct communication link is established between the identified seller and each of the registered one or more customers. In one aspect of the present embodiment, the direct communication link is established by the product transaction subsystem 116.

In step 716, the received request of the product order is forwarded to the identified seller for delivery. In one aspect of the present embodiment, the received request of the product order is forwarded by the product transaction subsystem 116.

In step 718, acceptance message for the forwarded request of the product order is received by the identified seller. In one aspect of the present embodiment, the acceptance message for the forwarded request of the product order is received by the product transaction subsystem 116.

In step 720, the delivery of the product order to the registered one or more customers associated with the received request is completed upon accepting the received request. In one aspect of the present embodiment, the delivery of the product order to the registered one or more customers associated with the received request is completed by the product transaction subsystem 116. In such embodiment, for delivering the product order to each of the registered one or more customers, the method 700 includes delivery through seller delivery within the determined delivery area and customer pick up within the determined product pickup area.

In step 722, payment of the delivered product order is transferred directly to the identified seller from the registered one or more customers through the one or more payment preferences. In one aspect of the present embodiment, payment of the delivered product order is transferred by a transaction management subsystem 118. In such embodiment, the method 700 also facilitates dispute settlement, cancellation facility, and refund payment in association with the delivered product order.

The method 700 also includes registering each of one or more sellers with seller information. The seller information comprises seller address information, delivery area information, selling mode information and product information. In such embodiment, the selling mode information comprises at least one of delivery mode and pick up mode.

The method 700 also includes registering each of one or more customers with customer information. The customer information comprises customer address information, customer location information and the one or more purchasing parameters. In such embodiment, the one or more purchasing parameters includes price range information and product category information.

In transferring the payment of the delivered product order directly to the identified seller from the registered one or more customers through one or more payment preferences, the method 700 includes receiving, at a real time, a preferred payment mode and bank account information from the identified seller. For example, the preferred payment mode may be direct bank transfer, UPI transfer, wallet transfer, net-banking, or the like. The bank account information includes bank account number, bank code, account holder name, bank branch and the like. The method 700 includes establishing a secure payment link between the received bank account information of the identified seller and a payment type of the registered one or more customers via a payment gateway. The registered one or more customers may choose one among a plurality of payment types to complete the payment. The payment type may be for example, direct bank transfer, credit card transfer, debit card transfer, cash on delivery, net-banking, wallet transfer, or any other mode of amount transfer. The method 700 further includes transferring payment amount from the payment type of the registered one or more customers directly to the received bank account information of the identified seller via the established secure payment link.

In identifying the seller from the list of the registered one or more sellers based on received request of the product order, the method 700 includes determining local sellers in proximity to the current location of the registered one or more customers. Local sellers are small vendors capable of delivering the product desired faster and cheaper compared to shopping marts, big marts, or the like.

Various embodiments of the present disclosure relate to a system for managing a local area shopping network. The computing system 100 enables one or more seller to define a targeted area for selling sell their products. In such embodiment, the one or more sellers can provide pickup, delivery or both options for fulfilment. Customers and sellers are connected in a single platform, and transaction is facilitated. Any disputes are directly handled by the seller. A buyer can dispute, cancel, request refund for any transaction directly with the seller Through the computing system 100, a seller with no walk-in facility can still do business locally and sell products in a defined area. Multiple sellers' products are available on a single platform and multiple checkouts can be done on a single page. All these sellers' products can be added to the same cart and the cart will group them per seller for different checkout using same payment method. Customers may easily check for everything online that can be delivered to a certain address by different sellers. Moreover, customers may provide feedback and reviews for each of the products.

The computing system 100 provides sellers a way to define custom delivery area and custom schedule. Further, the computing system 100 also provides sellers to sell their products in a specified local area radius and provide services such as pickup and delivery to the customers. Google maps are used fetching location information. The current architecture of the computing system 100 uses software programs such as MongoDB, ReactJS, HTML, JavaScript and the like.

The computing system 100 displays all products that are available for purchase from sellers who meet a filter criteria based on a user location and a search criteria. The computing system 100 initially filters all sellers who meet the location and geofencing criteria and searches for products among those sellers. If no sellers are found, the computing system 100 notifies the buyer that no seller meets their criteria.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (as shown in FIG. 1) (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

I claim:

1. A system for managing a local area shopping network, the system comprising:
   a hardware processor; and
   a memory coupled to the hardware processor, wherein the memory comprises a set of program instructions in the form of a plurality of subsystems, configured to be executed by the hardware processor, wherein the plurality of subsystems comprises:
   an order request subsystem is configured to receive a request of a product order from registered one or more customers, wherein the request comprises customer information, product information and a preferred mode of order receival;
   a parameter determination subsystem configured to:
   determine a delivery area and a delivery schedule for each of registered one or more sellers based on the received request, wherein the delivery area is a delivery perimeter for each of registered one or more sellers;
   determine product pickup area for each of the registered one or more customers based on the received request, wherein the product pickup area is a customer pickup perimeter;
   determine a current location information of the registered one or more customers associated with the received request based on real-time location tracking model;
   extract product information from the received request;
   apply the product related information onto a trained artificial intelligence-based parameter determination model;
   determine the delivery area listed by the registered one or more sellers matching the extracted product related information based on output of the trained artificial intelligence-based parameter determination model;
   extract the delivery area information and the selling mode information from the received request;
   apply the delivery area information and the selling mode information of each of the registered one or more sellers to an artificial intelligence-based scheduling model;
   determine the delivery schedule based on output of the trained artificial intelligence-based scheduling model, wherein the delivery schedule comprises delivery once in a day, delivery once in a week and delivery twice in a week;

extract the purchasing mode information from the received customer information;

apply the purchasing mode information of each of the registered one or more customers to an artificial intelligence-based parameter determination model; and determine geofence product pickup area based on output of a trained artificial intelligence-based parameter determination model;

a product transaction subsystem executed on the processor and configured to:

detect a list of the registered one or more sellers based on the determined delivery area for each of the registered one or more sellers and the determined current location information of the registered one or more customers;

identify at least one seller from the detected list of the registered one or more sellers based on the received request of the product order;

establish a direct communication link between the identified seller and each of the registered one or more customers;

forward the received request of the product order to the identified seller for delivery;

receive acceptance message for the forwarded request of the product order from the identified seller; and complete the delivery of the product order to the registered one or more customers associated with the received request upon accepting the received request; and a transaction management subsystem configured to transfer payment of the delivered product order directly to the identified seller from the registered one or more customers through one or more payment preferences.

2. The system of claim 1, further comprising a registration subsystem configured to:

register each of one or more sellers with seller information, wherein the seller information comprises seller address information, delivery area information, selling mode information and product information, wherein the selling mode information comprises at least one of delivery mode and pick up mode; and register each of one or more customers with customer information, wherein the customer information comprises customer address information, customer location information and one or more purchasing parameters, wherein the one or more purchasing parameters comprises price range information and product category information.

3. The system of claim 1, wherein in identifying the seller from the list of the registered one or more sellers based on received request of the product order, the product transaction subsystem is configured to:

extract product information from the received request, wherein the product related information comprises product category, product quantity, product specifications;

determine first set of sellers accepting orders for the extracted product information from a prestored list of sellers;

extract one or more search strings related to preferred mode of order receival from the received request of product order;

determine final set of sellers from among the determined first set of sellers matching the extracted preferred mode of order receival by mapping the extracted one or more search strings related to preferred mode of order receival with corresponding prestored search strings for mode of order receival; and identify best seller from among the determined final set of sellers based on user rating, delivery speed, and proximity to current location of the registered one or more customers.

4. The system of claim 1, wherein in identifying the seller from the list of the registered one or more sellers based on received request of the product order, the product transaction subsystem is configured to:

determine local sellers in proximity to the current location of the registered one or more customers.

5. The system of claim 1, wherein the transaction management subsystem is configured to manage dispute settlement, cancellation facility, and refund payment in association with the delivered product order.

6. The system of claim 1, wherein for delivery of the product order to each of the registered one or more customers, the product transaction subsystem is configured to enable delivery by communication with a seller delivery entity within the determined delivery area and customer pick up within the determined product pickup area.

7. The system of claim 1, wherein in transferring the payment of the delivered product order directly to the identified seller from the registered one or more customers through one or more payment preferences, the transaction management subsystem is configured to:

receive, at a real time, a preferred payment mode and bank account information from the identified seller;

establish a secure payment link between the received bank account information of the identified seller and a payment type of the registered one or more customers via a payment gateway, wherein the registered one or more customers choose one among a plurality of payment types to complete the payment; and transfer payment amount from the payment type of the registered one or more customers directly to the received bank account information of the identified seller via the established secure payment link.

8. A method for managing a local area shopping network, the method comprising:

receiving, by a processor, a request of a product order from registered one or more customers, wherein the request comprises customer information, product information and a preferred mode of order receival;

determining, by the processor, a delivery area and a delivery schedule for each of registered one or more sellers based on the received request, wherein the delivery area is a delivery perimeter for each of registered one or more sellers;

determining, by the processor, product pickup area for each of the registered one or more customers based on the received request, wherein the product pickup area is a customer pickup perimeter;

determining, by the processor, a current location information for the registered one or more customers associated with the received request based on real-time location tracking model;

extracting, by the processor, product information from the received request;

applying, by the processor, the product related information onto a trained artificial intelligence-based parameter determination model;

determining, by the processor, the delivery area listed by the registered one or more sellers matching the extracted product related information based on output of the trained artificial intelligence-based parameter determination model;

extracting, by the processor, the delivery area information and the selling mode information from the received request;

applying, by the processor, the delivery area information and the selling mode information of each of the registered one or more sellers to an artificial intelligence-based scheduling model;

determining, by the processor, the delivery schedule based on output of the trained artificial intelligence-based scheduling model, wherein the delivery schedule comprises delivery once in a day, delivery once in a week or delivery twice in a week;

extracting, by the processor, the purchasing mode information from the received customer information;

applying, by the processor, the purchasing mode information of each of the registered one or more customers to an artificial intelligence-based parameter determination model;

determining, by the processor, geofence product pickup area based on output of the trained artificial intelligence-based parameter determination model;

detecting, by the processor, a list of the registered one or more sellers based on the determined delivery area for each of registered one or more sellers and the determined current location information of the registered one or more customers;

identifying, by the processor, at least one seller from the detected list of the registered one or more sellers based on received request of the product order;

establishing a direct communication link, by the processor, between the identified seller and each of the registered one or more customers;

forwarding, by the processor, the received request of the product order to the identified seller for delivery;

receiving, by the processor, acceptance message for the forwarded request of the product order by the identified seller;

completing, by the processor, the delivery of the product order to the registered one or more customers associated with the received request upon accepting the received request; and transferring, by the processor, payment of the delivered product order directly to the identified seller from the registered one or more customers through the one or more payment preferences.

9. The method of claim 8, further comprising:

registering each of one or more sellers with seller information, wherein the seller information comprises seller address information, delivery area information, selling mode information and product information, wherein the selling mode information comprises at least one of delivery mode and pick up mode; and registering each of one or more customers with customer information, wherein the customer information comprises customer address information, customer location information and the one or more purchasing parameters, wherein the one or more purchasing parameters comprises price range information and product category information.

10. The method of claim 8, wherein in identifying the seller from the list of the registered one or more sellers based on received request of the product order, the method comprises:

extracting product information from the received request, wherein the product related information comprises product category, product quantity, product specifications;

determining first set of sellers accepting orders for the extracted product information from a prestored list of sellers;

extracting one or more search strings related to preferred mode of order receival from the received request of product order;

determining final set of sellers from among the determined first set of sellers matching the extracted preferred mode of order receival by mapping the extracted one or more search strings related to preferred mode of order receival with corresponding prestored search strings for mode of order receival; and identifying best seller from among the determined final set of sellers based on user rating, delivery speed, and proximity to current location of the registered one or more customers.

11. The method of claim 8, wherein identifying the seller from the list of the registered one or more sellers based on received request of the product order comprises:

determining local sellers in proximity to the current location of the registered one or more customers.

12. The method of claim 8, further comprising facilitating management of dispute settlement, cancellation facility, and refund payment in association with the delivered product order.

13. The method of claim 8, wherein for delivering the product order to each of the registered one or more customers, the method comprises delivery through seller delivery within the determined delivery area and customer pick up within the determined product pickup area.

14. The method of claim 8, wherein transferring the payment of the delivered product order directly to the identified seller from the registered one or more customers through one or more payment preferences comprises:

receiving, at a real time, a preferred payment mode and bank account information from the identified seller;

establishing a secure payment link between the received bank account information of the identified seller and a payment type of the registered one or more customers via a payment gateway, wherein the registered one or more customers choose one among a plurality of payment types to complete the payment; and transferring payment amount from the payment type of the registered one or more customers directly to the received bank account information of the identified seller via the established secure payment link.

* * * * *